March 31, 1925.  1,531,316
E. R. SMITH
DEMOUNTABLE RIM FOR AUTOS
Filed Oct. 14, 1924
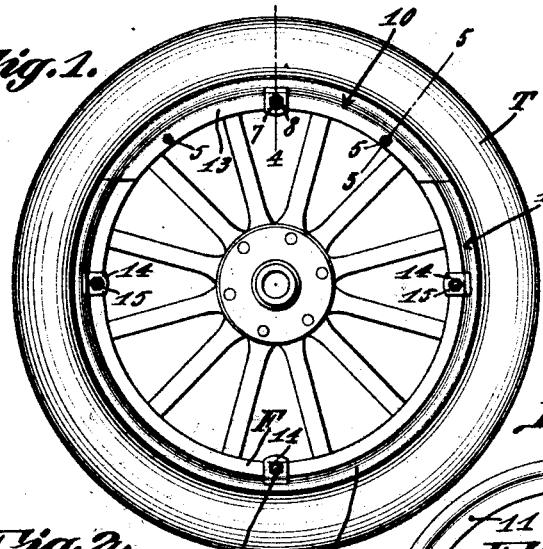
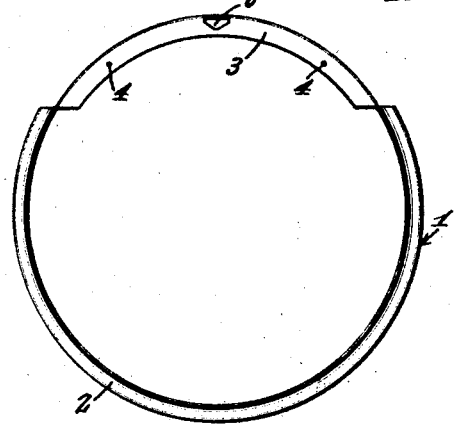
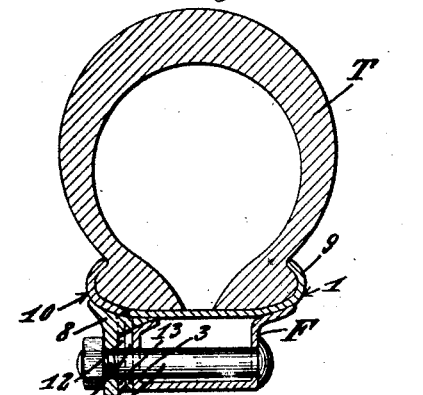
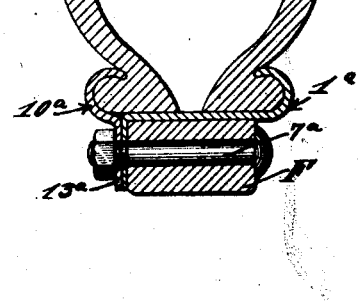
E. R. Smith, Inventor
By C. A. Snow & Co.
Attorneys

Patented Mar. 31, 1925.

UNITED STATES PATENT OFFICE.

EDWIN R. SMITH, OF PARIS, TEXAS.

DEMOUNTABLE RIM FOR AUTOS.

Application filed October 14, 1924. Serial No. 743,586.

*To all whom it may concern:*

Be it known that I, EDWIN R. SMITH, a citizen of the United States, residing at Paris, in the county of Lamar and State of Texas, have invented a new and useful Demountable Rim for Autos, of which the following is a specification.

This invention relates to rims for automobile wheels either demountable or permanent.

The object of the invention is to provide a rim of this character so constructed that the tire may be easily removed and replaced and which is cheap to construct and substantial in structure.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a wheel equipped with a rim constructed in accordance with this invention;

Fig. 2 is a similar view of the rim shown detached with the tire attaching plate removed;

Fig. 3 is a side elevation of the tire attaching plate detached;

Fig. 4 is a transverse section taken on the line 4—4 of Fig. 1;

Fig. 5 is a similar view taken on the line 5—5 of Fig. 1; and

Fig. 6 is a transverse section showing the invention applied to a fixed rim, the other figures showing it applied to a demountable rim.

In the embodiment illustrated in Figs. 1 to 5 a demountable wheel rim 1 is shown having a retaining flange 2 extending around the perimeter of the wheel and having a section or segment 3 thereof cut and bent downward as shown in Fig. 2 and which is designed to lie flat against the outer face of the wheel felly F. This bent down portion 3 of the flange is equipped with bolt holes 4 to accommodate bolts 5 which also pass through the detachable tire attaching sections 10 shown in Fig. 3. Said section 10 being equipped with corresponding bolt holes 11 which register with those 4 in the bent down flange portion 3. These bolts 5 hold the removable section 10 securely to the rim 1 thereby permitting the removal of the entire rim with the tire T in place. The bent flange 3 and the removable section 10 are also equipped with registering apertures 6 and 12 respectively for the passage of the screw bolt 7 and the wedge 8 when in position on the wheel as is shown clearly in Figs. 1 and 4.

The section 10 which is designed to fill the gap formed by the bent down portion 3 of the flange 2 is constructed in the form of a segmental plate, the outer edge of which is circular and curved to engage the bead of the tire T forming when applied a continuation of flange 2. The body portion 13 of this section 10 extends down and covers the bent down flange portion 3 and lies flat against its outer face to which it is secured by the bolts 5 as above described. A wedge-lug 8 is carried by the screw bolt 7 passing through the apertures 12 and 6. The extended lower portion or body 13 of the removable section 10 not only operates as a means of attachment to the remainder of the rim but also as a stiffener insuring the rigidity of this portion of the rim. The rim 1 is otherwise constructed similar to rims of this character in general use and includes the usual lip or flange 9.

To remove the rim 1 from the wheel with the tire in place thereon the lug-wedge 8 and through bolt 7 are removed together with the remainder of the wedges and through bolts shown at 14 and 15 respectively.

To remove the tire from the rim the bolts 5 are loosened and the plate or section 10 removed which permits the tire to slip off readily from the rim.

To remove the tire without removing the rim from the wheel the through bolt 7 and wedge together with the bolts 5 are removed and after plate or section 10 has been taken off the tire may be slipped off the rim, while it remains in place on the wheel.

This removable tire attaching plate or section 10 is applicable for use on fixed rim vehicles as well as on the demountable type as is shown clearly in Fig. 6 which is accomplished by forming the gap or break in the outer flange 1$^a$ and omitting the turned down portions 3 which is shown in the other form, the plate 10$^a$ is then bolted directly through the felly of the wheel in which event a wedge-lock is omitted and a screw bolt used at this place.

I claim:—

1. A wheel rim having tire engaging flanges along its side edges with one of said flanges slit transversely and bent inwardly to form a combined reinforcing and attaching member, and a segmental plate to fit in the space formed by the bending down of said flange, said plate having a flange to form a continuation of the mutilated flange, the plate overlying the inturned flange member, and means for removably securing said plate to said flange.

2. A wheel rim having tire engaging flanges along its side edges with one flange slit transversely at peripherally spaced points and the portion between said slits bent inwardly at right angles to form an attaching member, said attaching member having bolt-holes therein, and a segmental plate to fit flat against said bent in flange portion and equipped with a registering bolt-hole and having at its outer edge a flange to form a continuation of the mutilated flange.

In testimony that I claim the foregoing as my own, I have hereto affixed my signature in the presence of two witnesses.

EDWIN R. SMITH.

Witnesses:
 THELMA BRALINE,
 H. H. MOOMAW.